April 14, 1964   S. F. MALAKER ETAL   3,128,605
CLOSED CYCLE CRYOGENIC SYSTEM
Filed Nov. 30, 1962
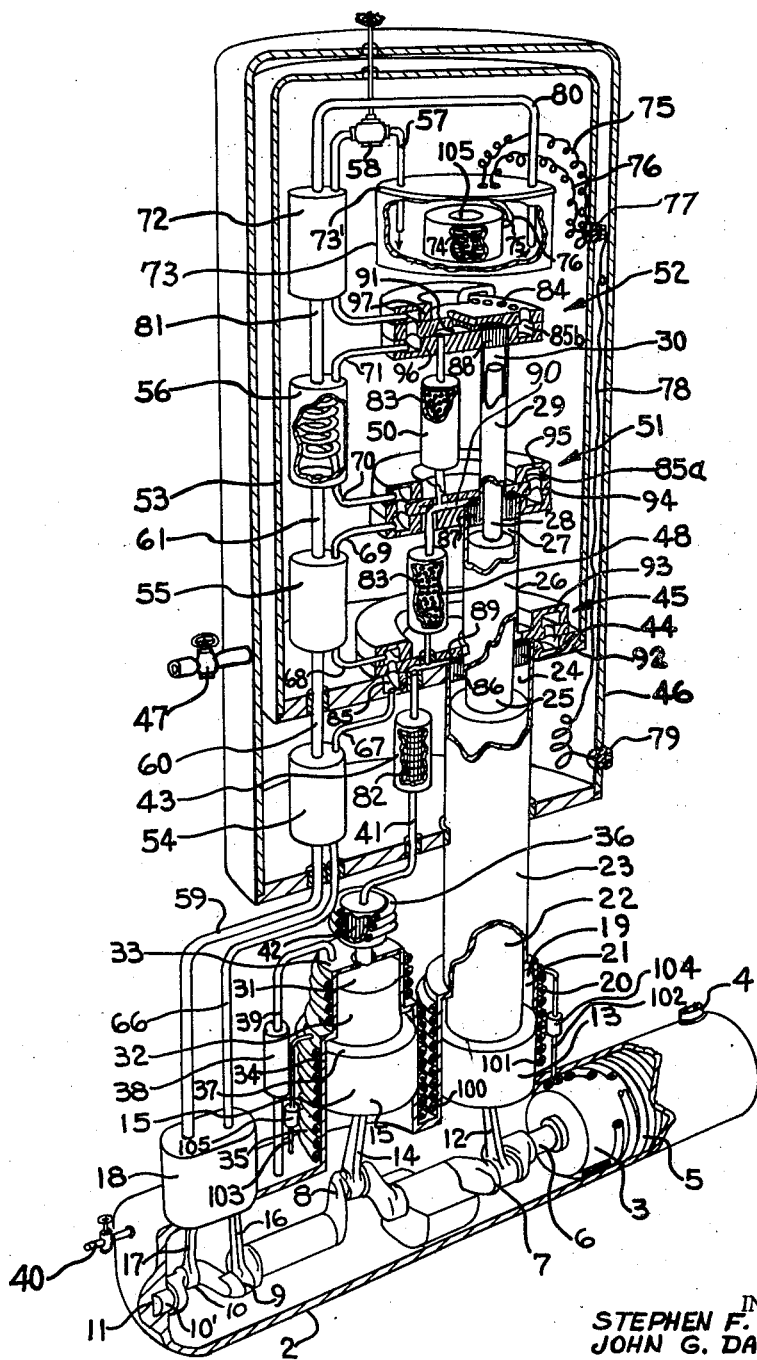
INVENTORS
STEPHEN F. MALAKER
JOHN G. DAUNT
BY
ATTORNEY

United States Patent Office 3,128,605
Patented Apr. 14, 1964

3,128,605
CLOSED CYCLE CRYOGENIC SYSTEM
Stephen F. Malaker, Mountainside, N.J., and John G. Daunt, Columbus, Ohio, assignors to Malaker Laboratories, Inc., Clinton, N.J., a corporation of New Jersey
Filed Nov. 30, 1962, Ser. No. 241,221
8 Claims. (Cl. 62—6)

This invention relates to a closed cycle cryogenic system capable of maintaining a very low temperature, such as a temperature of 4.2° K., which is near the boiling point of helium. More specifically, it deals with a closed cycle cryogenic system based on a cascaded Stirling cycle refrigerating engine, using no moving valves, expansion nozzles, constrictions, or the like, and adapted for the operation of a super-conducting magnet system.

In copending application Serial No. 102,489, filed on April 12, 1961 by Stephen F. Malaker and John G. Daunt now Patent No. 3,074,244 there was described a simple cryogenic engine operating on a modified Stirling cycle and adapted for production of very low temperatures. The present invention employs a modification of the aforesaid engine, as will be hereinafter outlined, and employs it as a part of a novel, highly versatile closed cycle refrigeration system for production of temperatures near the boiling point of helium, and suitable for the operation of superconducting magnets. Since the thermodynamic relations of the Stirling cycle and the novel engine employing same have been adequately outlined in the aforesaid application, the discussion herein will be limited specifically to the newly modified engine as is employed in the present invention.

In order to maintain very low temperatures in the neighborhood of, say 4.2° K., the present invention employs a 3-stage engine, using the modified Stirling cycle of operation, and providing three temperature levels of operation, say, 100° K. as the first, 40° K. as the second, and 15° K. as the third. The final step of refrigeration to 4.2° K. is performed by a closed helium liquefaction loop, using the Joule-Thomson expansion effect, the helium gas circulating in the loop being cooled by the refrigerating engine. The entire system may be integrally constructed and readily transported.

The invention will be more readily understood by reference to the accompanying drawing, in which a preferred embodiment is described, and in which the figure presents, partly in cross-section, a side view of a refrigeration system cut away in parts made in accordance with the present invention.

Referring again to the drawing, numeral 2 refers to a gas-tight crankcase containing helium gas at 200 p.s.i.a., and totally enclosing an electric motor 3, say of 4⅓ horsepower capacity. A suitable gas-sealed plug 4 provides a plug-in for the electrical supply to the mottor. The motor also is cooled by water coils 5 which are then led out of housing 2.

Motor 3 drives crankshaft 6 which includes expander piston crank 7, compression piston crank 8 and auxiliary helium compressor cranks 9 and 10. The end 10' of the crankshaft rides in bearing 11 inside the end of crankcase 2. Thus, it will be noted that motor 3 and all of its immediately driven members are totally enclosed in the crankcase, so that shaft sealing problems are eliminated. Connecting rod 12 is attached to expander guide piston 13 for reciprocating same, while connecting rod 14 is attached for reciprocation of compressor piston 15. Connecting rods 16 and 17 reciprocate the pistons in auxiliary helium compressor 18. The phase difference between the compressor piston 15 movement and the multiple expansion piston 13 movement is approximately 90°, the increase in the expansion volumes leading the increase in the compressor volume.

Cylinder 19 for expander guide piston 13 is cooled by water flowing through coils 20. Space 21 worked on by piston 13 is the expander pressure compensating volume. Piston 13 is connected to smaller diameter expander piston 22 riding in cylinder 23, both of which latter provide the first space expander volume 24 for the compressed helium. Piston 22, in turn, is connected to smaller diameter piston 25 riding in cylinder 26 and providing the second stage expander volume 27. Then, piston 28, of still smaller bore, is attached to the end of piston 25. It rides in cylinder 29 and these provide the third stage expander volume 30.

From the aforesaid, it will be noted that the three expansion volumes, at about 100° K., at about 40° K. and at about 15° K., are formed by stepped reduction in diameter in tandem relation of the multiple piston 22. Each expansion volume 24, 27 and 30 has the same stroke, and, most importantly, their increases bear the same phase difference with the compressor volume 31 increase. By making compressor piston 32 and multiple expansion piston 22 integral with their respective "guide" pistons 15 and 13, respectively, the guide pistons serve as crossheads, and thus improvement is obtained in maintenance of compression, increased mechanical life of the moving parts, etc. Those parts of the cylinder walls 19, 33 and 34 which operate in an ambient temperature atmosphere are water-cooled by coils 20, 35 and 36.

Compression guide piston 15 riding in its cylinder 34 (which is disposed in parallel relation to cylinder 19) provides compression pressure compensating volume 37. As already stated, both the expander piston 13 and compressor piston 15 have pressure compensating volumes 21 and 37, respectively, which essentially are closed volumes. However, they are connected to the volume of crankcase 2 through lines 102 and 103, respectively, in which are installed one-way relief valves 104 and 105, respectively, set at 200 p.s.ia., for example. These valves are connected in a manner such that if the pressure in volumes 21 and 37, respectively, go below 200 p.s.i.a. minimum crankcase pressure, for example, the valves will open and gas will flow from the crankcase to volumes 21 and 37. The compression ratios of the volumes 21 and 37, respectively, are chosen in the design to be such that the pressures in volumes 21 and 37, as a function of the crank angle, are in first approximation the same as in the working gas located in compression volume 31 and the expansion volumes 24, 27 and 30. By using this, the pressure difference across the piston rings on pistons 22, 25, 28 and 32 is minimized, thus minimizing unwanted blowback past these rings. Attached to the end of piston 15 is smaller diameter compressor piston 32 providing compressor volume 31.

All of the pistons carry rings for maintenance of compression and expansion spaces. For simplicity, these rings are not shown in the figure of the drawing. However, it is to be noted that there are rings in the multiple expansion piston between each of the expansion volumes, between the lowest expansion volume, and the pressure compensating volume, and between the latter and the crankcase volume. The mechanical parts of the engine operate without oil, which eliminates oil vapor contamination of the working gas which passes to and fro between the compressor volume and the expansion volumes.

Each of the low temperature expansion volumes of the engine operate on the same principle as that in the single stage unit. Gas is supplied to each regenerator at the temperature of the stage below and in the correct phase relative to the common compressor volume. The general designs of the various parts of the engine are, in essence, similar to those described in the aforesaid applications Serial No. 102,489.

In considering the first stage comprising the compressor volume 31 and the lowest expansion volume 24, helium gas is maintained in these spaces as the working medium at a minimum pressure of 200 p.s.i.a., the same as that in the crankcase 2. This minimum pressure is maintained by having a one-way relief valve 38 in line 39 between crankcase 2 and compressor volume 31. Maintenance of this pressure in the crankcase through valved line 40 minimizes the work load on the drive and greatly minimizes blow-back past the piston rings. The gas is alternately transferred to and fro between the compressor volume 31 and the expander volume via line 41, the rate of cycling being determined by the motor speed which, for this engine, may be, say 1200 r.p.m.

In passage from the compressor volume 31, the gas first passes through an after-cooler 42 in order to remove the heat of compression. This unit consists of a large number of narrow bore tubes arranged in parallel, the exteriors of the tubes being water-cooled. From the after-cooler, the gas passes through a regenerator 43, which will be described later. This regenerator is a device which, on reverse passage of the gas through it, the emergent gas returning to the compressor volume is only a few degrees cooler than when it entered it during the earlier part of the cycle. Moreover, it is such that the temperature of the gas entering and emerging from the warm end (i.e., the end closest the after-cooler) is very different from that emerging and entering at the cold end. For example, the warm end for the first regenerator 43 maintains approximately 320° K., whereas the cold end maintains approximately 100° K. Its use minimizes the unwanted transport of refrigeration back to the compressor volume 31 on the return cycle of the gas flow.

From the cold end of the first regenerator 43, the gas passes through first cooler 45, which is a constant temperature heat exchanger attached thermally to the "head" of the first (100° K.) expansion volume 24. From cooler 45, the gas passes into the first expansion volume 24.

The top of the first expansion cylinder 23 and piston 22 is at a considerably lower temperature than its lower end, the top being at 100° K., while the lower end is at ambient temperature. In order to minimize heat losses to the top end, the top end and a major length of the cylinder 23 is enclosed in a vacuum jacket 46, the vacuum being drawn out through valved nipple 47. The amount of vacuum employed in the jacket is as much as is adequate to give the desired insulating effect. Although, theoretically, a vacuum of less than $10^{-6}$ mm. Hg is desirable, in practice it is found sufficient to evacuate the jacket down only to about 10 to 20 microns of pressure, and then to valve it off from the vacuum pump by closing valve 47. The cold parts within partial vacuum then, by a cryopumping effect, will reduce the pressure automatically to an adequately low value. Although a vacuum is employed herein as insulation, it is, of course, to be understood that other type of insulation, such as foamed plastic, cork, and the like may be employed, if conditions require it. The wall of cylinder 23, between the place where it is attached to the vacuum jacket 46 and the top (cold) end, also is made of thin-walled stainless tubing, to minimize heat conduction along it. Also, that part of piston 22 which is above the ambient temperature situs on the cylinder wall is made of a poorly heat-conducting material, such as "Micarta" type insulating composition, made of laminated paper or linen with phenolic based plastic impregnant.

The second and third expansion stages operate in a manner similar to the first. Between each stage is a regenerator. For example, regenerator 48 is disposed between cooler 45 and cooler 51, while regenerator 50 is situated between coolers 45 and 51. These regenerators serve to minimize any loss of refrigeration from an upper stage to a stage below. As specified previously, the required phase difference between the compressor volume 31 and the second expansion volume 27 and third expansion volume 30 is maintained automatically by the multiple expansion piston 22. Furthermore, between second regenerator 48 and the expansion volume 27 (at 40° K.) and between the third regenerator 50 and the expansion volume 30 (at 15° K.), there are coolers (constant temperature heat exchangers 51 and 52), the mechanical construction of which is similar to that of cooler 45.

The first expansion stage has attached to it a radiation shield 53 which surrounds and shields all parts of the system which are at temperatures below about 100° K. This greatly minimizes loss of heat by radiation from the ambient surroundings (the vacuum jacket 46) to those parts at temperatures below about 100° K. It has been found that removal of this radiation heat influx at a 100° K. level is more economical of power than removal of it at lower temperatures.

Staging the refrigeration at many temperature levels, rather than attempting to carry it out in one single stage, greatly improves the thermodynamic efficiency, resulting in lower power requirements. Furthermore, the problem of the design of the regenerators 43, 48 and 50 and of the heat exchangers 54, 55 and 56, which are required for the closed Joule-Thomson helium loop 57, is greatly simplified and the requirements on their thermodynamic efficiencies is greatly eased. This temperature staging allows compensation for the unwanted heat losses by conduction along those components heating temperature gradients to be made more economically and to be made thermodynamically more efficient. Furthermore, it allows radiation shielding to be made, thus increasing the thermodynamic efficiency. And finally, it is of importance since the efficiency of refrigeration of a Stirling cycle system diminishes rapidly when the ratio of the temperatures of the warm and cold volumes exceeds a value of about 4.

It has been found that the step in refrigeration between 15° K. and 4.2° K. is an extremely difficult one to perform by means of a Stirling cycle engine, chiefly because of the difficulty of construction of an adequately efficient regenerator to operate between these two temperatures. For high efficiency, a regenerator must have a high heat capacity for the filler material with small volume, and materials are not known so far which can satisfy these requirements adequately at these extremely low temperature levels.

A unique feature of the present invention is the carrying out of the 15° K. to 4.2° K. step by liquefaction of helium, using a closed-loop Joule-Thomson expansion technique. Since the flow in this cold loop need only be sufficient for the actual refrigerative load at 4.2° K., the volume flow rate is relatively small. For a 1-watt load at 4.2° K., the amount of helium liquefied should be 0.58 s.c.f.m. This closed-loop Joule-Thomson helium circuit is shown in FIGURE 1. It begins at the auxiliary compressor 18 which draws in helium gas at 15 p.s.i.a. and delivers it at 220 p.s.i.a. The total gas flow rate, based on a liquefaction coefficient at the Joule-Thomson expansion valve 58 of 13% must be 4.5 s.c.f.m. for a 1-watt refrigerative load at 4.2° K. This auxiliary compressor 18 is an oil-free type, having a power requirement of about ⅓ h.p., allowing for both compressor and motor inefficiencies. For simplicity, the after-cooler and filter, which are of conventional construction and which follow this auxiliary compressor, are not shown.

The high pressure helium gas (at approximately 220 p.s.i.a.) delivered by compressor 18 passes into the vacuum jacket 46 at the warm (bottom) end, and thence through line 66, through heat exchanger 54, then through line 67 and into cooler 45, from which it leaves through line 68 and enters heat exchanger 55, from which it leaves through line 69, entering cooler 51. It leaves the latter cooler through line 70 and passes through heat exchanger 53. From this unit, leaves through line 71 and enters cooler 52, thus having bridged three temperature levels: (1) ambient to 100° K., (2) 100° K. to 40° K., and (3) 40° K. to 15° K.

On emerging from cooler 52, the high pressure gas, now at 220 p.s.i.a. and 15° K., passes into the final Joule-Thomson heat exchanger 72 and then through the Joule-Thomson expansion valve 58, at which it liquefies. The liquefied fraction (about 13% of the total gas circulated) is collected in a suitable reservoir 73 which is located in vacuo within the radiation shield 53. Reservoir 73 (having removable top 73') serves as the final "evaporator" of the overall refrigation system, where the 4.2° K. level is maintained. In this reservoir may be placed a superconducting magnet, a coil 74 of wire made of niobium-zirconium alloy, for example, having leads 75 and 76 leading to insulated outlet plug 77 in radiation shield 53. Into this plug may be connected cable 78 leading to insulated, vacuum-sealed plug 79 for connection to any exterior device desired. Equipment desired to be placed inside magnet 74 (for testing, and the like) may be placed in hollow core 105.

The helium gas drawn from reservoir 73 by auxiliary compressor 18 passes through line 80, then through heat exchanger 72, then through line 81 into heat exchanger 56, then through line 61 into heat exchanger 55 and similarly through line 60 and heat exchanger 54, from which it serves as feed through line 59 for compressor 18.

Regenerator 43 is filled with a metallic network (metal wool), such as lead-plated copper wool 82. Regenerators 48 and 50 are filled with spherical particles of lead 83, arranged to yield adequate heat capacity at the low operating temperatures. It is highly desirable that the dead volume in these regenerators be less than 0.25 times the effective volume of the hotter cylinder, and that regenerator efficiency is at least 93%. In passing through the regenerators, the heated gas gives up its heat to the metal packing 82, 83 and then passes to the cool end of the expander volume where the gas is transferred at approximately constant volume between the compression and expansion ends. For this reason, coolers 45, 51 and 52 are in the form of milled heavy plates containing perforations 84 near the periphery to allow unrestricted flow of gas through the annular spaces 85 within the coolers.

It will be noted that the cylinder heads 86, 87 and 88 for pistons 22, 25 and 28, respectively, are perforated thick heat-conducting metal plates which form the bases for coolers 45, 51 and 52, respectively, enabling the gases to move readily in inner spaces 89, 90 and 91, respectively, between plates 92 and 93, 94 and 95, and 96 and 97, respectively, as the gases reciprocate back and forth between generators 43, 48 and 50, and their respective expander volumes 24, 27 and 30. The aforesaid plates of coolers 45, 51 and 52 have peripherally-disposed spaces 85, 85a, and 85b through which the compressed helium from auxiliary compressor 18 passes on its way to reservoir 73, for liquefaction.

For a 1-watt load at 4.2° K., the system of the present invention would have the following approximate specifications:

| Mechanical Element | Bore, Inches | Stroke, Inches | Temperature Level, °K. |
|---|---|---|---|
| Compression cylinder | 2 | 1.5 | Ambient (300° K.) |
| First expander cylinder | 1.5 | 0.75 | 100 |
| Second expander cylinder | 0.75 | 0.75 | 40 |
| Third expander cylinder | 0.5 | 0.75 | 15 |

| | |
|---|---|
| Pressures (Helium Medium): | |
| Lowest pressure in the working spaces | 200 p.s.i.a. |
| Average crankcase pressure | 200. |
| Output pressure from auxilliary compressor | 220. |
| Input pressure to auxilliary compressor | 15. |
| Gas flow through auxilliary compressor | 4.5 s.c.f.m. |
| Engine speed | 1,200 r.p.m. |
| Overall height of unit | 40" approx. |
| Overall diameter of unit | 8" approx. (excluding motor volume). |

From the foregoing description, it is apparent that the exceedingly low temperature obtained by this invention is obtained with relatively high efficiency, without contamination by dirt, oil or chemical impurities, since it is a closed-cycle system operable for extended periods of time. The entire system is self-contained, requiring no continuous gas supply, and it is readily transportable. The reliability, ease of maintenance, and simplicity of construction are features highly sought in such units which often have trouble with engine valves, and the like. There are no constrictive passages, so that blockage problems are avoided.

We claim:

1. A transportable closed-cycle deep refrigeration unit comprising,
    a gas-tight housing designed to hold a working gas, and having two separate engine cylinders projecting upwardly therefrom in parallel relation to each other, and having an electric motor mounted therein for driving said unit,
    an engine designed to operation on a working gas supplied within said housing, using the Stirling cycle, and connected to and in operating relation with said motor, and having a compression piston reciprocatable in one of said cylinders and an expander piston reciprocatable in said other cylinder with a phase difference of about 90°, between which pistons a working gas is cycled,
    said expander piston comprising a composite of three pistons of equal strokes superimposed upon each other in tandem relation with decreasing diameters,
    said expander cylinder comprising a composite of three cylinders superimposed upon each other in tandem relation with decreasing diameters, and designed so that an expander volume is present at the end of the stroke of each piston,
    an after-cooler mounted above said compression cylinder for cooling compressed gas from said cylinder,
    a cooler connected in heat transfer relation with each expander cylinder head for cooling compressed gases therefrom,
    a first regenerator connected between said after-cooler and the first cooler of said expander cylinder,
    a second regenerator connected between the first cooler and the second cooler and a third regenerator between said second cooler and the third cooler, for minimizing the unwanted transport of refrigeration to the higher temperature levels as compressed working gas is cycled back and forth between each expander volume and its interconnected cooler, whereby each successive cooler establishes a colder temperature level, the lowest temperature being maintained at the third cooler,
    line means for returning said working gas to said compressor for recycling,
    insulation means for enclosing such of the aforesaid equipment as is maintained at low temperatures, and
    cooling means for cooling said compression cylinder and the lower portion of said expander cylinder.

2. A transportable closed-cycle deep refrigeration unit comprising,
    a gas-tight housing designed to hold a working gas, and having two separate engine cylinders projecting upwardly therefrom in parallel relation to each other, and having an electric motor mounted therein for driving said unit,
    an engine designed to operate on a working gas supplied within said housing, using the Stirling cycle, and connected to and in operating relation with said motor, and having a compression piston reciprocatable in one of said cylinders and an expander piston reciprocatable in said other cylinder with a phase difference of about 90°, between which pistons a working gas is cycled, said expander piston comprising a composite of three cylinders superimposed upon each other in tandem relation with decreasing diameters, and designed so that an expander volume is present at the end of the stroke of each piston, an after-cooler mounted above said compression cylinder for cooling compressed gas from said cylinder, a cooler connected in heat transfer relation with each expander cylinder head for cooling compressed gases therefrom, a first regenerator connected between the first cooler and the second cooler and a third regenerator between said second cooler and the third cooler, for minimizing the unwanted transport of refrigeration to the higher temperature levels as compressed working gas is cycled back and forth between each expander volume and its interconnected cooler, whereby each successive cooler establishes a colder temperature level, the lowest temperature of the three being maintained at the third cooler.

a Joule-Thomson expansion valve connected to the third cooler for cooling the working gas to the lowest temperature of the unit, a closed liquefied working gas reservoir connected to and serving as storage for output from said Joule-Thomson valve, wherein the lowest temperature of the unit is maintained, compression means and lines for supplying compressed working gas to each of said coolers, in succession with decreasing temperature, line means for returning said working gas from said reservoir to said compressor means for recycling, insulation means for enclosing such of the aforementioned equipment as is maintained at low temperatures, and cooling means for cooling said compressor cylinder and the lower portion of said expander cylinder.

3. A transportable closed-cycle deep refrigeration unit, comprising, a gas-tight housing designed to hold a working gas under pressure, and having two separate engine cylinders projecting upwardly therefrom in parallel relation to each other, and having an electric motor mounted therein for driving said unit, an engine designed to operate on a working gas supplied within said housing, using the Stirling cycle, and connected to and in operating relation with said motor, and having a compression piston reciprocatable in one of said cylinders and an expander piston reciprocatable in said other cylinder with a phase difference of about 90°, between which pistons a working gas is cycled, a driven auxiliary compressor for working gas and having an intake line and a working gas outlet line, said expander piston comprising a composite of three pistons of equal strokes superimposed upon each other in tandem relation with decreasing diameters, said expander cylinder comprising a composite of three cylinders superimposed upon each other in tandem relation with decreasing diameters, and designed so that an expander volume is present at the end of the stroke of each piston, an after-cooler mounted above said compression cylinder for cooling compressed gas from said cylinder, a cooler connected in thermal relation with each expander cylinder head for cooling compressed gases entering therein, a first regenerator mounted between said after-cooler and the first cooler of said expander cylinder, a second regenerator mounted between said first cooler and said second cooler, and a third regenerator between said second cooler and said third cooler, for minimizing the unwanted transport of refrigeration to the higher temperature levels as compressed working gas is cycled back and forth between each expander volume and its interconnected cooler, a first heat exchanger arranged for contacting, in heat exchange relation, compressor intake working gas with said outlet line working gas, and having an outlet for leading working gas from said first heat exchanger to said first cooler in heat-exchange relation with engine-cycled gas therein, wherein a first low temperature level is maintained, a second heat exchanger arranged in heat exchange relation with intake working gas to be fed to the first heat exchanger, and having an outlet line for leading working gas from said second heat exchanger to said second cooler in heat exchange relation with engine-cycled working gas therein, wherein a second low temperature level is maintained, a third heat exchanger arranged in heat exchange relation with intake working gas to be fed to said second heat exchanger, and having an outlet line for leading working gas from said third heat exchanger to said third cooler in heat exchange relation with the engine-cycled gas therein, wherein a third low temperature level is maintained, a fourth heat exchanger arranged in heat exchange relation with intake working gas to be fed to said third heat exchanger, and having an outlet line for leading working gas from said fourth heat exchanger to a liquefied working gas reservoir, a Joule-Thomson expansion valve disposed in said fourth heat exchanger outlet line for cooling working gas to a still lower temperature, a closed liquefied working gas reservoir serving as storage for output from said Joule-Thomson valve, wherein the lowest temperature level of the unit is maintained, a line for leading off working gas from said reservoir as intake gas for said compressor, and connected for heat exchange with outlet working gas in said fourth heat exchanger, connecting lines for leading compressor working gas intake between the fourth and third heat exchangers, the third and second heat exchangers, and the second and first heat exchangers, consecutively, insulation means enclosing such of the aforesaid equipment as is mentioned at low temperature, and cooling means for cooling said compression cylinder and the lower portion of said expander cylinder.

4. A transportable closed cycle deep refrigeration unit comprising, a gas-tight housing designed to hold a working gas, and having two separate engine cylinders projecting upwardly therefrom in parallel relation to each other, and having an electric motor mounted therein for driving said unit, an engine designed to operate on a working gas supplied within said housing, using the Stirling cycle, and connected to and in operating relation with said motor, and having a compression piston reciprocating in one of said cylinders and an expander piston reciprocating in said other cylinder with a phase difference of about 90°, between which pistons a working gas is cycled, said expander piston comprising a composite of one largest piston of short stroke and three pistons of equal strokes, all superimposed upon each other in tandem relation with decreasing diameters, said compression piston comprising a composite of two pistons superimposed upon each other in tandem relation with decreasing diameters, the larger compression piston being the compensating pressure piston, said expander cylinder comprising a composite of four cylinders superimposed upon each other in tandem relation with decreasing diameters, and designed so that a compensating pressure volume is present at the end of the stroke of the first largest piston, and an expander volume is present at the end of the stroke of each of the other pistons, said compression cylinder comprising a composite of two cylinders superimposed upon each other in tandem relation with decreasing diameters, and designed so that a compensating pressure volume is present at the end of the stroke of the first larger piston, and an expander volume is present at the end of the stroke of the other compression piston, one-way venting means connecting each of the compensating pressure volumes with said housing, an after-cooler mounted above said compression cylinder for cooling compressed gas from said cylinder, a cooler connected in heat transfer relation with each expander cylinder volume for cooling compressed gases therefrom.

a first generator connected between said first cooler and said second cooler and a third regenerator between said second cooler and said third cooler for minimizing the unwanted transport of refrigeration to the higher temperature levels as compressed working gas is cycled back and forth between each expander volume and its interconnected cooler, whereby each successive cooler establishes a colder temperature level, the lowest temperature of the three being maintained at the third cooler, a Joule-Thomson expansion valve connected to the third cooler for cooling the working gas to the lowest temperature of the unit, a closed liquefied working gas reservoir connected to and serving as storage for output from said Joule-Thomson valve, wherein the lowest temperature of the unit is maintained, compression means and lines for supplying compressed working gas to each of said coolers, in succession with decreasing temperature, line means for returning said working gas from said reservoir to said compressor means for recycling, insulation means for enclosing such of the aforementioned equipment as is maintained at low temperatures, and cooling means for cooling said compression cylinder and the largest cylinder of the expander cylinder.

5. A transportable closed-cycle refrigeration unit for producing temperatures in the neighborhood of 4° K., comprising, a gas-tight housing designed to hold a helium compression medium under pressure, and having two separate engine cylinders projecting upwardly therefrom in parallel relation to each other, and having a cooled electric motor mounted therein for driving said motor, an engine designed to operate on helium supplied within said housing, using the Stirling cycle, and connected to and in operating relation with said motor, and having a compression piston reciprocatable in one of said cylinders and an expander piston reciprocatable in said other cylinder with a phase difference of about 90°, between which pistons helium is cycled, an auxilliary helium compressor mounted at said housing and driven from within said housing by a motor, and having an intake line and an outlet line, said expander piston comprising a composite of three pistons of equal strokes superimposed upon each other in tandem relation with decreasing diameters, and designed so that an expander volume is present at the end of the stroke of each piston, an after-cooler mounted above said compression cylinder for cooling compressed gas from said cylinder, a cooler connected in thermal relation with each expander cylinder head for cooling compressed gases therefrom, a first regenerator connected between said after-cooler and the first cooler of said first expander cylinder, a second regenerator connected between said first cooler and said second cooler, and a third regenerator between said second cooler and said third cooler, for minimizing the unwanted transport of refrigeration to the higher temperature levels as compressed helium is cycled back and forth between each expander volume, a first heat exchanger arranged for contacting, in heat exchange relation, compressor intake helium with said outlet line helium, and having an outlet line for leading helium from said first heat exchanger to said first cooler in heat exchange relation with engine-cycled gas therein, wherein about a 100° K. level is maintained, a second heat exchanger arranged in heat exchange relation with intake helium to be fed to the first heat exchanger, and having an outlet line for leading helium from said second heat exchanger to said second cooler in heat exchange relation with engine-cycled gas therein, wherein about 40° K. level is maintained, a third heat exchanger arranged in heat exchange relation with intake helium to be fed to said second heat exchanger, and having an outlet line for leading helium from said third heat exchanger to said third cooler in heat exchange relation with the engine-cycled gas therein, wherein about a 15° K. level is maintained, a fourth exchanger arranged in heat exchange relation with intake helium to be fed to said third heat exchanger and having an outlet line for leading helium from said fourth heat exchanger to a liquid helium reservoir, a Joule-Thomson expansion valve disposed in said fourth heat exchanger outlet line for cooling helium to a still lower temperature, a closed liquid helium reservoir serving as storage for output from said Joule-Thomson valve, wherein a temperature level of about 4° K. level is maintained, a line for leading off gaseous helium from said reservoir as intake gas for said compressor, and connected for heat exchange with outlet helium in said fourth heat exchanger, connecting lines for leading compressor helium intake between the fourth and third heat exchangers, the third and second heat exchangers, and the second and first heat exchangers, consecutively, an insulating radiation shield enclosing all of the aforesaid equipment maintained at and above said 100° K. level and above the first heat exchanger and first regenerator, an insulating vacuum jacket enclosing all of the aforesaid equipment disposed within said radiation shield and including said first heat exchanger and the upper portion of said expander cylinder, and cooling means for cooling said compression cylinder and the lower portion of said expander cylinder.

6. A transportable closed-cycle deep refrigeration unit according to claim 2 in which a one-way relief valve is disposed between said housing and the compression cylinder volume.

7. A transportable closed-cycle deep refrigeration unit according to claim 2 in which the upper portion of the expander piston is made of material having poor heat conductivity.

8. A transportable closed-cycle deep refrigeration unit according to claim 2 in which a superconducting magnet is disposed within the reservoir, and current carrying means for said magnet connected in insulating relation with said reservoir, said radiation shield, and said vacuum jacket.

References Cited in the file of this patent

UNITED STATES PATENTS

| | | |
|---|---|---|
| 2,966,035 | Gifford | Dec. 27, 1960 |
| 3,074,244 | Malaker | Jan. 22, 1963 |